(12) United States Patent
Wessel et al.

(10) Patent No.: US 8,632,286 B2
(45) Date of Patent: Jan. 21, 2014

(54) TRANSPORTATION UNIT FOR A WIND TURBINE ROTOR BLADE

(75) Inventors: Thomas Wessel, Rheine (DE); Dirk-Jan Kootstra, Beuningen (NL)

(73) Assignee: General Electric Company, Schenectady, NY (US)

( * ) Notice: Subject to any disclaimer, the term of this patent is extended or adjusted under 35 U.S.C. 154(b) by 1701 days.

(21) Appl. No.: 11/380,770

(22) Filed: Apr. 28, 2006

(65) Prior Publication Data
US 2007/0253829 A1 Nov. 1, 2007

(51) Int. Cl.
*B60P 7/08* (2006.01)

(52) U.S. Cl.
USPC ............. 410/35; 410/32; 410/34; 410/44; 410/46

(58) Field of Classification Search
USPC ......... 410/44, 45, 53, 32, 33, 34, 35, 46, 120; 206/443; 211/13.1, 60.1; 220/1.5, 23.2, 220/23.4
See application file for complete search history.

(56) References Cited

U.S. PATENT DOCUMENTS

| | | | |
|---|---|---|---|
| 4,015,715 A | 4/1977 | Kelf | |
| 6,983,844 B2 | 1/2006 | O'Kane et al. | |
| 7,303,365 B2 * | 12/2007 | Wobben | 410/45 |
| 7,690,875 B2 * | 4/2010 | Grabau | 410/45 |
| 2003/0175089 A1 | 9/2003 | Almind | |
| 2004/0060839 A1 * | 4/2004 | Hergeth | |
| 2005/0002749 A1 | 1/2005 | Andersen et al. | |
| 2005/0019166 A1 | 1/2005 | Bervang | |
| 2005/0031431 A1 | 2/2005 | Wobben | |
| 2005/0180833 A1 | 8/2005 | Almind | |
| 2006/0113449 A1 | 6/2006 | Nies | |
| 2006/0144741 A1 | 7/2006 | Wobben | |
| 2006/0251517 A1 | 11/2006 | Grabau | |
| 2006/0285937 A1 | 12/2006 | Wobben | |

FOREIGN PATENT DOCUMENTS

| | | |
|---|---|---|
| WO | WO02/083523 A1 | 10/2002 |
| WO | WO02083523 | 10/2002 |
| WO | WO03057528 A1 | 7/2003 |

OTHER PUBLICATIONS

EPO Search Report, App. No. 07106735.9 (Jun. 21, 2007).
Chinese Patent Office, Transportation Unit for a Wind Turbine Rotor Blade, First Office Action and Text of First Office Action, 5 pages.

* cited by examiner

*Primary Examiner* — Stephen Gordon
(74) *Attorney, Agent, or Firm* — James McGinness; Armstrong Teasdale LLP

(57) ABSTRACT

A transportation system for a wind turbine rotor blade is provided. The transportation system includes a root fixture adapted to receive the root end of the wind turbine rotor blade, and a tip end fixture adapted to receive a tip end of the wind turbine rotor blade. The root fixture and the tip end fixture are provided as separate transportable units.

4 Claims, 4 Drawing Sheets

TRANSPORTATION UNIT FOR A WIND TURBINE ROTOR BLADE

BACKGROUND OF THE INVENTION

This invention relates generally to a transportation system for a wind turbine rotor blade and to a transportation rack for such a wind turbine rotor blade. In particular, the present invention relates to a modular transportation unit for a wind turbine rotor blade.

The transportation of large rotor blades from the fabrication site to the construction site of a wind turbine poses a technical problem. Since wind turbines are often located in remote areas, the rotor blades have to be transported to the construction sites by truck, ship or even helicopter. Therefore, a transportation system for wind turbine rotor blades has to guarantee secure transportation while providing the required flexibility. Especially, such a transportation system should allow easy loading and unloading of the rotor blade from one transport vehicle to another. Furthermore, it should be taken into account that large rotor blades have a considerable weight while also having a fragile elongated structure. Therefore, a transportation system for rotor blades should also provide protection against damages during transportation, loading and unloading.

Furthermore, wind turbines are often grouped together in so called wind parks. Typically, each of the wind turbines in a wind park has three rotor blades. Therefore, the number of rotor blades which have to be shipped to a specific construction site is relatively high. For a transportation system to be efficient, it should therefore make good use of the available transport space.

Wind turbines have considerably increased in size and power during recent years. Accordingly, the rotor diameter of wind turbines has increased up to maximum diameters of more than 100 meters. Therefore, also the length of the rotor blades of a wind turbine has considerably increased. Recent wind turbine designs utilize rotor blades having a blade length of up to 70 meters or more.

BRIEF DESCRIPTION OF THE INVENTION

In view of the above, a transportation system for a wind turbine rotor blade is provided. The transportation system comprises a root fixture adapted to receive the root and of a wind turbine rotor blade and a tip end fixture adapted to receive a tip end of the wind turbine rotor blade, wherein the root fixture and the tip end fixture are provided as separate transportable units.

Further aspects, advantages and features of the present invention are apparent from the dependent claims, the description and the accompanying drawings.

According to a first aspect of the present invention, a modular transportation system for a wind turbine rotor blade is provided. The modular system includes a root retainer for holding the root end of the wind turbine rotor blade and a tip end retainer for holding a tip end of the wind turbine rotor blade, wherein the root retainer and the tip end retainer are formed individual devices. Since the root retainer and the tip end retainer are provided as individual devices, a distance between the retainers may be adapted to the length of a rotor blade to be transported. Furthermore, the distance and position of the retainers with respect to each other may be adjusted with respect to a vehicle on which the rotor blade is transported. Thus, the retainers are suited for different blade models/designs without requiring modification of the retainers themselves. Furthermore, the retainers can be adapted to comply with international safety regulations as required by authorities worldwide. The retainers protect the rotor blade from all forces, moments and accelerations to which they are subjected during transportation. Thus, damage on the rotor blades during transportation and during loading and unloading is prevented.

According to an embodiment of the present invention, the root and/or tip end retainers have forklift shoes to facilitate loading and unloading of the rotor blade.

According to another embodiment of the present invention, the root and/or tip end retainers have a twist lock flange which is adapted for fastening the root and/or tip end retainer to a supporting structure of a transportation vehicle. Thus, easy and fast assembling and disassembling of the transportation system on a transportation vehicle is enabled.

According to a further embodiment of the present invention, the tip end retainer includes a shell in which the rotor blade can be received. Typically, the rotor blade will be positioned in the shell in a chord-wise direction wherein, typically, the rotor blade is disposed within the shell on a nose side of the rotor blade.

According to another aspect of the present invention, a transportation platform is provided. The transportation platform includes a plate-like structure which is mounted on at least two columns. The length of the columns is specified so that the root end of the rotor blade together with a root container holding the root can be disposed beneath the plate-like structure. In other words, the length of the columns is such that it is greater than the chord-wise dimension of a rotor blade to be transported. Thus, several rotor blades can be transported in an upright position and still be stacked in layers. In this context, the term "upright position" means that the chord-wise direction of the rotor blades extends in a in a vertical direction. Thus, stacking of rotor blades during transportation is allowed by the platform in that a lower layer of wind turbine rotor blades can be disposed beneath the plate-like structure and a second layer of wind turbine rotor blades can be disposed on top of the plate-like structure.

According to a further embodiment of the present invention, the surface of the plate-like structure is prepared so that root and/or tip end retainers can be attached to it, e.g. by twist lock fasteners. Thus, a two-storied transportation system for wind turbine rotor blades can be assembled.

According to an even further embodiment of the present invention, the columns and the plate-like structure can be assembled and disassembled, e.g. by bolt connections. Thus, the volume of the transportation rack can be considerably reduced when no rotor blades have to be transported. Accordingly, the transportation rack can be disassembled for return after delivery of the rotor blades at the construction site. Thus, the transportation costs for transporting the rack back to the manufacturing facility or to a port are considerably reduced.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
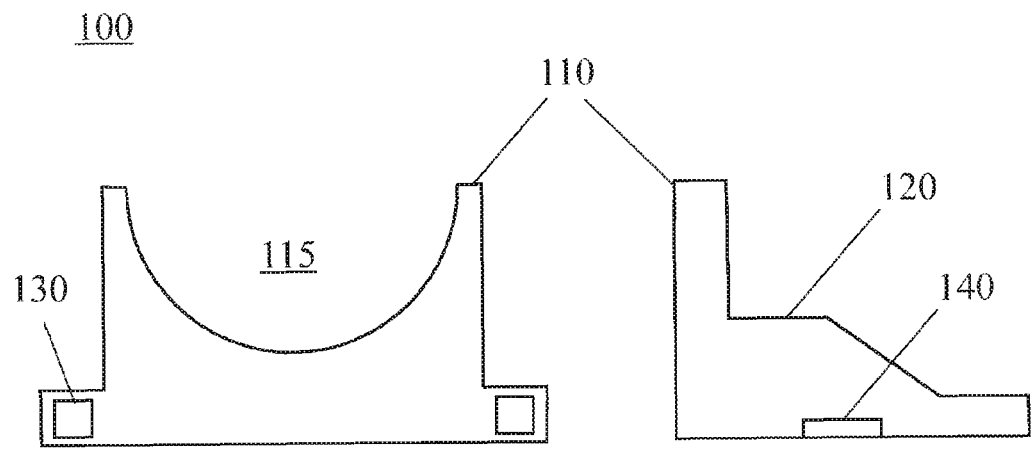
FIG. 1 is a front view and a side view of an exemplary embodiment of a root fixture.

FIG. 1 is a front view and a side view of an exemplary embodiment of a root fixture, or support, 100. Root support 100 includes an end flange 110. End flange 110 provides a cylindrical recess 115 in which the root of a wind turbine rotor blade (not shown in FIG. 1) can be received. Furthermore, root support 100 includes forklift shoes 130 to facilitate easier loading and/or unloading of the support 100 by a forklift. Root support 100 includes a bearing 120 for the wind turbine rotor blade. In some embodiments, bearing 120 has a bearing surface which is formed as a segment of a cylinder wall. The radius of the cylinder wall is adapted to the radius of the blade root. Furthermore, root support 100 has a twist lock flange 140 for fastening root support 100 to a support structure (not shown in FIG. 1).

Figure 2:
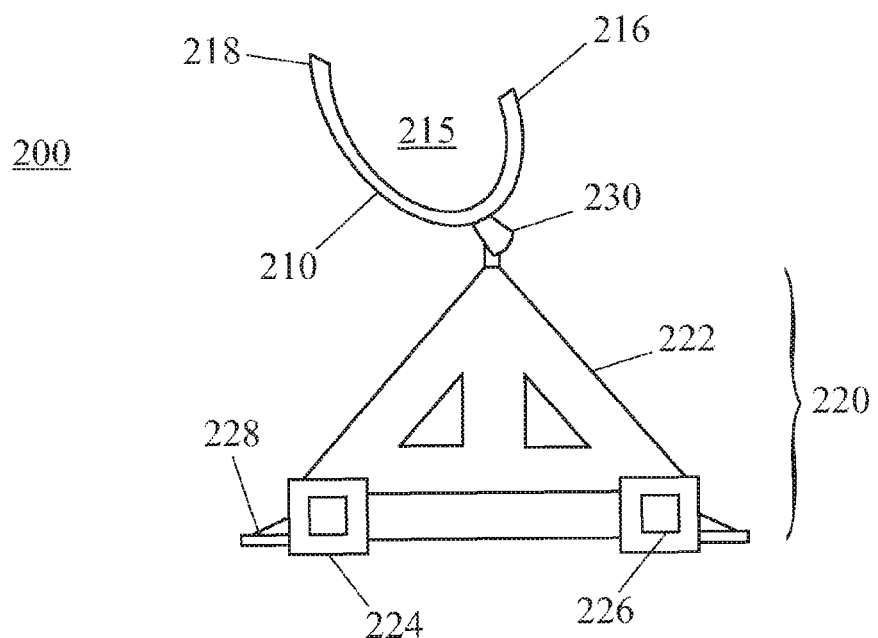
FIG. 2 is a front view of an exemplary embodiment of a tip end fixture.
Figure 3:
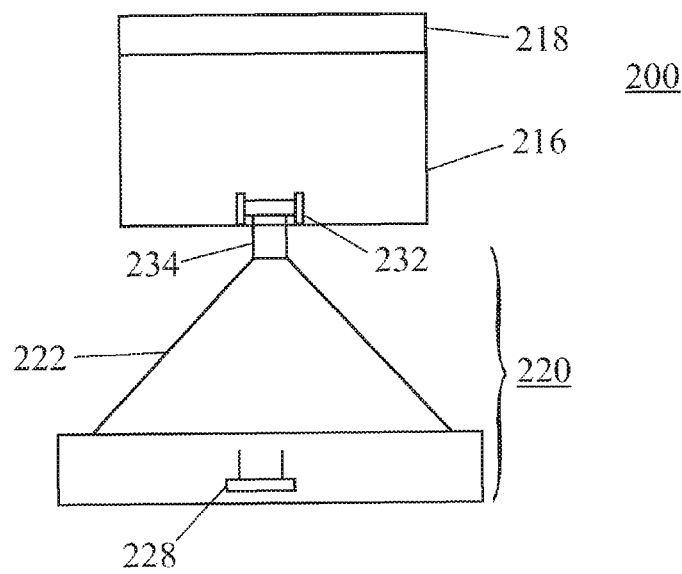
FIG. 3 is a side view of the tip end fixture shown in FIG. 2.

FIG. 2 is a front view of an exemplary embodiment of a tip end fixture, or support, 200. FIG. 3 is a side view of tip end support 200. Tip end support 200 includes a receptacle 210 mounted to a support structure 220 by means of a pivot bearing 230. Receptacle 210 is formed as a retainer shell having a long branch 218 and a somewhat shorter branch 216. Retainer shell 210 provides a space 215 between the shell walls in which a tip end of a rotor blade can be received. In some embodiments, the cross-sectional shape of receptacle 210 is adapted to the shape of a nose end side of a rotor blade. Support structure 220 includes two squares 224 to which support rods 222 are attached. Squares 224 include openings 226 and, thus, serve as forklift shoes. Similar to root support 100, tip end support 200 includes twist lock flanges 228.

Support structure 220 and receptacle 210 are connected to each other via a pivot bearing 230. Pivot bearing 230 includes a pivot axle 232 and a bearing 234. In some embodiments, pivot bearing 230 can be locked a predetermined pivot angle so that various transport positions of the rotor blade (not shown in FIGS. 2 and 3) can be adjusted. Moreover, in some embodiments, receptacle 210 may be pivoted from an upright position to an almost horizontal position. Thus, a rotor blade may be transported in different positions varying between an upright and a horizontal position. This may facilitate adjusting the transportation position of a rotor blade according to the space provided by a transportation vehicle and the safety regulations imposed thereon. In some embodiments and/or circumstances, the blade will not be transported in upright position because this position is unstable. Instead, the rotor blade will be leaned towards one of its sides, i.e. receptacle 210 will be inclined at a predetermined pivot angle. Thus, gravitational force presses the rotor blade onto one side of receptacle 210. Typically, this side will be formed as a longer wall 218 so that the surface supporting the rotor blade is enlarged.

Figure 4:
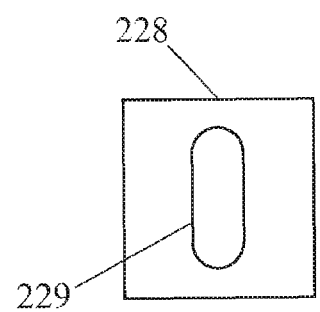
FIG. 4 is a top view of an exemplary embodiment of a twist lock flange that may be used with the root fixture shown in FIG. 1 and/or the tip end fixture shown in FIGS. 2 and 3.

FIG. 4 is a top view of an exemplary embodiment of a twist lock flange 228 that may be used with root support 100 (shown in FIG. 1) and/or tip end support 200 (shown in FIGS. 2 and 3). Flange 228 includes an elongated opening 229 through which the upper part of a conventional twist lock (not shown) can be inserted. After insertion, the upper part of a twist lock is twisted to secure root support 100 and/or tip end support 200 to a supporting structure (not shown in FIG. 4). Thus, twist lock flange 228 may facilitate mounting root supports 100 and/or tip end supports 200 to a supporting structure in a fast and easy manner.

Figure 5:
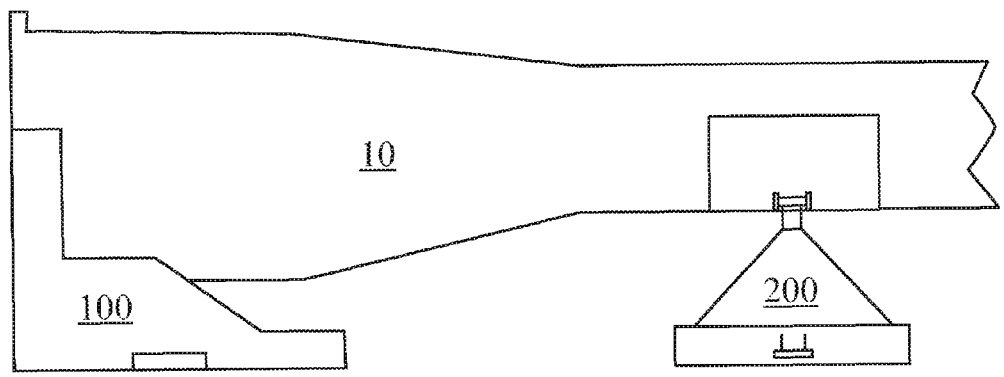
FIG. 5 is a side view of an exemplary embodiment of a transportation system including the root fixture shown in FIG. 1 and the tip end fixture shown in FIGS. 2 and 3.

FIG. 5 is a side view of an exemplary embodiment of a transportation system, or unit, including root support 100 and tip end support 200. Therein, the root of a rotor blade 10 is received in root support 100. Typically, the root end will be fixed to root support, e.g. by bolts. For this purpose, bolt holes (not shown) may be provided in flange 110 of root support 100. Thus, the root end of rotor blade 10 is secured for transportation. As shown on the right hand side of FIG. 5, rotor blade 10 is supported by tip end support 200. Tip end support 200 is positioned on the tip end side of rotor blade 10 but supports rotor blade 10 at a location before the tip end. In other words, in the exemplary embodiment rotor blade 10 is supported at a position near but not directly at the tip end. At this position, rotor blade 10 may have sufficient integral strength for bearing the mechanical stress applied to its supporting portion. For example, in the exemplary embodiment tip end support 200 is spaced from the tip end of the rotor blade 10 by about five to ten meters. In some embodiments, tip end support 200 will be positioned within five 5% to 20% of the rotor blade length at the tip end side. It should be understood, that the exact positioning of tip end support 200 can be adjusted in accordance with the actual length and design of the rotor blade 10 to be transported, the structure of a transportation vehicle to which root and tip supports 100, 200 are mounted, or the like. The arrangement shown in FIG. 5 may provide stable and secure storing of rotor blade 10 during transportation. Due to the twist lock fasteners provided at root and tip supports 100, 200, the supports can be easily fastened and unfastened to various supporting structures, e.g. to a trailer frame, the weather deck of a ship, or the like. Since root support 100 and tip end support 200 are provided as separate units, they can be flexibly adjusted with respect to each other and, thus, can be flexibly used for different transportation purposes. In addition, forklift shoes provided at root support 100 and tip support 200 allow easy loading and unloading of rotor blade 10. In some embodiments, root and tip supports 100, 200 may facilitate protecting the rotor blade 10 from all known forces, moments and accelerations to which the rotor blade 10 is subjected during transportation.

Figure 6:
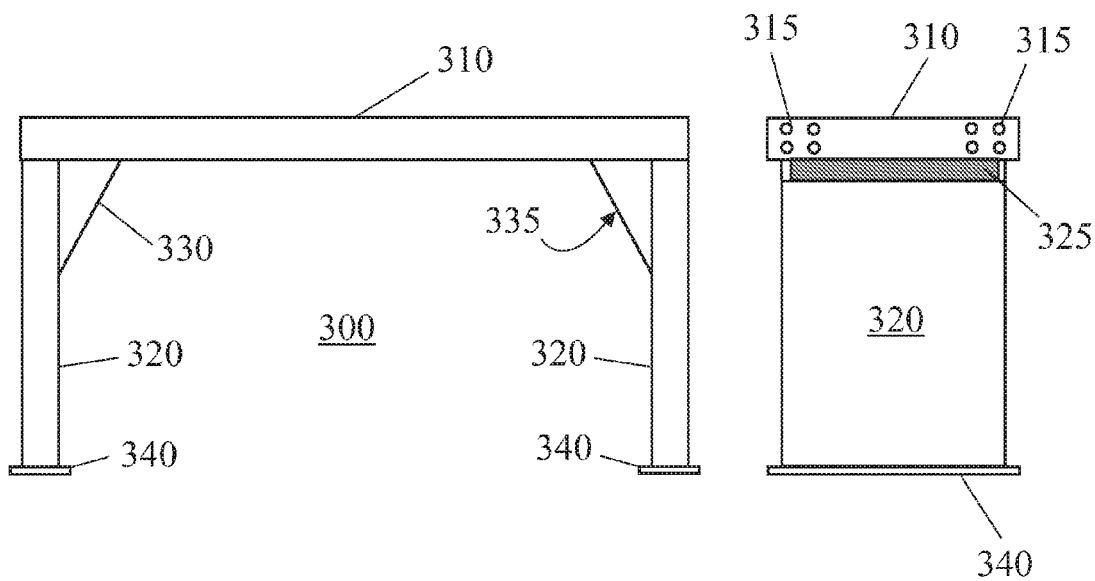
FIG. 6 is a front view and a side view of an exemplary embodiment of a transportation rack.

FIG. 6 is a front view and a side view of an exemplary embodiment of a transportation rack 300. Transportation rack 300 includes a slab 310 which is mounted to legs 320. Bracings 330 are provided for stiffening the transportation rack 300. Furthermore, flanges 340 are provided at the base end of legs 320. These flanges 340 are adapted for fastening rack 300 to a supporting structure, e.g. to the weather deck of a ship. For example, transportation rack 300 can be fixed to the weather deck of a ship in that flanges 340 are clamped by metal stoppers (not shown) which are welded to the weather deck. In principle, this technique is well-known in the art. Furthermore, in some embodiments, slab 310 and legs 320 are removably fitted to each other so that transportation rack 300 can be easily assembled and disassembled. Thus, the space required for transportation of rack 300 can be considerably reduced when the function of rack 300 is not required, e.g. during return freight when the rotor blades have been delivered at a construction site. In some embodiments, legs 320 can be mounted to slab 310 by conventional bolt connections (not shown). If this is the case, a box 335 is provided at the slab 310 or at least one of legs 320. Box 335 is adapted to receive the fixing bolts when transportation rack 300 is in a disassembled state to facilitate preventing any bolts from being lost during transportation of rack 300 in a disassembled state.

In the exemplary embodiment, leg 320 is shown as a solid structure. However it should be understood that leg 320 may itself be comprised of two or more legs. Furthermore, an opening 325 is formed in leg 320 to reduce the overall mass of leg 320. It should be understood that the dimensions of opening 325 may have to be adapted so that leg 320 still complies with the structural integrity requirements of rack 300. Furthermore, it can be seen that bolt holes 315 are provided that a lateral end side of slab 310. Bolt holes 315 can be used for fastening lateral extensions 350 to slab 310.

Figure 7:
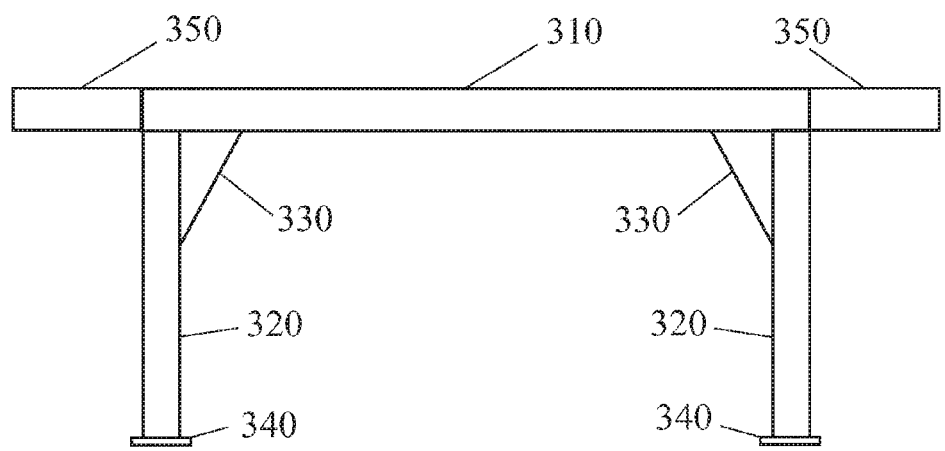
FIG. 7 is a front view of the transportation rack shown in FIG. 6 having an exemplary embodiment of a plurality of lateral extensions.

FIG. 7 illustrates an example of lateral extensions 350 being mounted to slab 310. Lateral extensions 350 provide more space on a top surface of transportation rack 300. In some embodiments, lateral extensions 350 may be used for transportation on larger (wider) ships. In other words, the length of slab 310 is sometimes adapted to standard ship sizes of ships used in blade transportation. The provision of lateral extensions 350 may facilitate exploitation of the space provided on larger ships.

Figure 8:
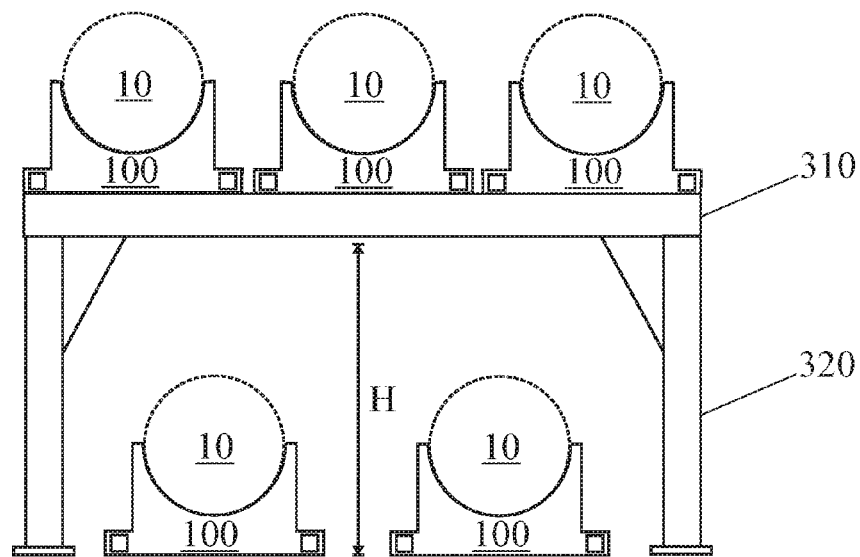
FIG. 8 is front view of the transportation rack shown in FIG. 6 having an exemplary arrangement of a plurality of the root fixtures shown in FIG. 1 mounted thereon.

FIG. 8 is front view of transportation rack 300 having an exemplary arrangement of a plurality of root supports 100 mounted thereon. Therein, it is shown how transportation rack 300 allows stacking of rotor blades 10 for transportation purposes. Root supports 100 are mounted on top of slab 310. Furthermore, root supports 100 are also mounted beneath slab 310 since the length H of legs 320 is sufficient so that the root ends of rotor blades 10 together with their respective root supports 100 can be disposed below slab 310. In other words, the maximum headroom H provided by transportation rack 300 is sufficient for receiving rotor blades 10 and their respective supports therein. Further root supports 100 are mounted on the top surface of slab 310. Typically, top surface 310 is adapted for twist lock systems so that root supports 100 can be easily mounted to slab 310 by twist lock fasteners. A second layer of rotor blades 10 (shown in dashed lines in FIG. 8) can be stacked on top the first layer positioned below slab 310. Thus, the area provided for transportation of rotor blades can be used more efficiently since also the third dimension is utilized by the transportation rack 300. In other words, the flat rack 300 may provide for more economic usage of storage space and more economic usage of shipping space by stacking of rotor blades on top of each other. Although only root supports 100 are shown in FIG. 8, it should be understood that, of course, also tip supports 200 can be mounted to transportation rack 300.

Figure 9:
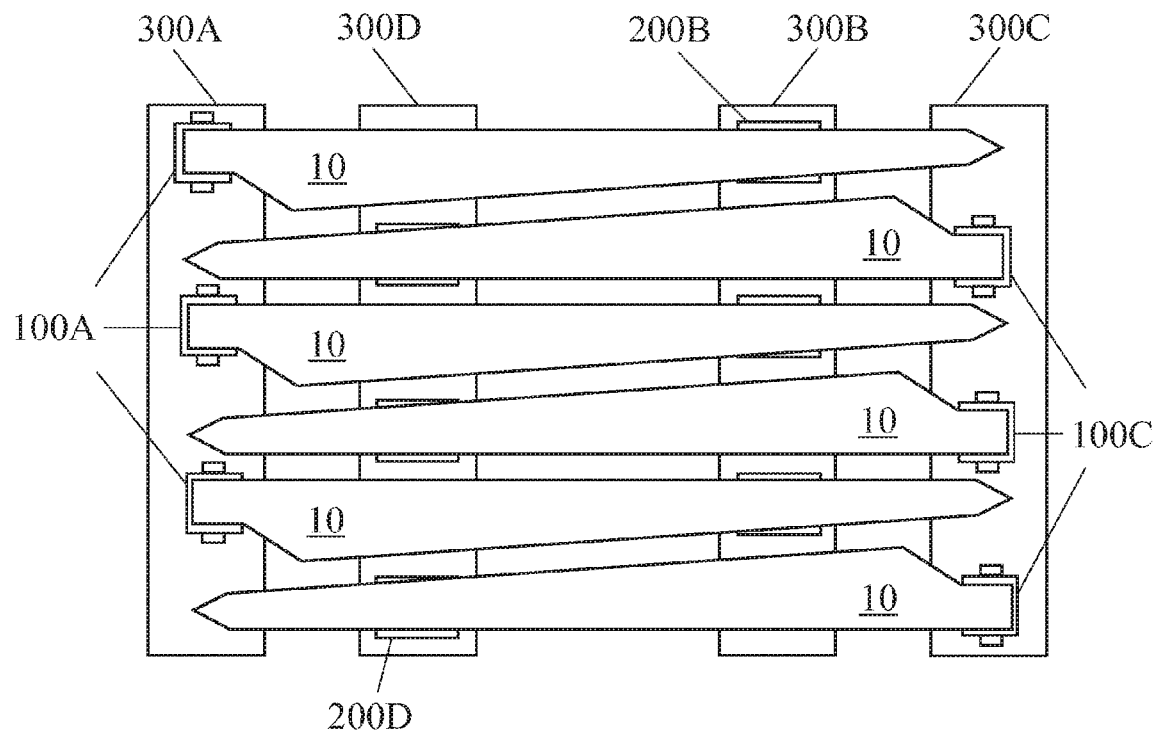
FIG. 9 is a top view of an exemplary embodiment of an arrangement of a plurality of the transportation racks shown in FIGS. 6 and 7 and a plurality of the root fixtures shown in FIG. 1.

FIG. 9 is a top view of an exemplary embodiment of an arrangement of a plurality of transportation racks 300 and a plurality of root supports 100. Therein, a first pair of transportation racks 300A, 300B is provided. First transportation rack 300A and second transportation rack 300B are disposed parallel to each other with respect to their longitudinal direction and spaced with respect to each other in a lateral direction. A plurality of first root supports 100A are mounted to the top surface of first flat rack 300A. A plurality of first tip supports 200B are mounted to the top surface of second flat rack 300B. The positions of first root supports 100A and first tip supports 200B are aligned with respect to each others so as to form respective pairs of first and second root and tip supports 100A, 200B. A first group of rotor blades 10 is supported by first root and tip supports 100A, 200B, wherein the root ends of the rotor blades are received in root supports 100A and the tip end sides of the rotor blades are supported by tip supports 200B. Furthermore, a second pair of flat racks 300C, 300D is provided. Similar to first pair 300A, 300B, second pair of flat racks comprises a third transportation rack 300C to which second root supports 100C have been mounted and a fourth flat rack 300D to which second tip supports 200D have been mounted. Third flat rack 300C bearing root supports 100C is disposed on the right-hand side of the arrangement next to second flat rack 300B bearing the first tip supports 200B. Fourth flat rack 300D bearing the second tip supports 200D is disposed adjacent to first flat rack 300A bearing the first root supports 100A. In other words, the arrangement of the second pair of flat racks 300C, 300D is mirrored with respect to the arrangement of the first pair of flat racks 300A, 300B but also shifted in a lateral direction. Thus, efficient use may be made of the available space. Furthermore, the fact that the tip end support is located at a position spaced from the actual tip end of the rotor blade is utilized in that the first and second pairs of transportation racks can be interleaved. Of course, a similar arrangement of root and tip supports can be provided below the transportation racks 300A, 300B, 300C, 300D which is not in shown in FIG. 9. Thus, the available transportation space is effectively utilized.

The above described aspects and embodiments may facilitate efficient exploitation of the space available for rotor blade transport. Furthermore, the system may be flexible to be adapted to various rotor blade sizes and even new designs. Because the transportation system can be disassembled after delivery of the rotor blades at the construction site, transportation costs for the return flight of the transportation system may be reduced.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:
1. A modular transportation unit for wind turbine rotor blades, said modular transportation unit comprising:
 a plurality of supports configured to support a respective section of a rotor blade, said plurality of supports comprising a first root support for a first root section of a first rotor blade and a first tip support for a first tip end section of the first rotor blade;

a first support frame comprising a first slab erected on a first support stand providing a first space below said first slab, said first space dimensioned for receiving said root section therein;

a second support frame comprising a second slab erected on a second support stand providing a second space below said second slab, said second space dimensioned for receiving said tip support therein;

a third support frame to which a second root support for a second root section of a second rotor blade is fixed; and a fourth support frame to which a second tip support for a second tip end section of the second rotor blade is fixed, said plurality of supports further comprising said second root support and said second tip support, wherein said fourth support frame is located between said first and second support frames and said second support frame is located between said third and fourth support frames.

2. The modular transportation unit according to claim 1, wherein a first flat top of said first slab is adapted for one of said first root support and said first tip support being fixed thereto, and wherein a second flat top of said second slab is adapted for said second root support and said second tip support being fixed thereto.

3. The modular transportation unit according to claim 1, wherein said first slab and said first support stand are adapted for assembling and disassembling thereof.

4. The modular transportation unit according to claim 1, wherein at least one of said first slab is removably coupled to said first support frame and said second slab is removably coupled to said second support frame.

* * * * *